United States Patent

Webb

[15] 3,699,438
[45] Oct. 17, 1972

[54] APPARATUS TO VISUALLY IDENTIFY AND TEST WIRES IN A MULTI-WIRE CABLE

[72] Inventor: Larry Joe Webb, Phoenix, Ariz.

[73] Assignee: Honeywell Information Systems Inc.

[22] Filed: Aug. 21, 1970

[21] Appl. No.: 65,762

[52] U.S. Cl. ..........................324/66, 324/51, 324/73
[51] Int. Cl. ...............................................G01r 31/02
[58] Field of Search...............324/51, 54, 66, 73, 133

[56] References Cited

UNITED STATES PATENTS

| | | | |
|---|---|---|---|
| 3,288,943 | 11/1966 | Bohnenblust............324/66 X |
| 3,286,175 | 11/1966 | Gerbier et al............324/73 R |
| 3,182,253 | 5/1965 | Dorsch et al. ................324/51 |
| 3,183,439 | 5/1965 | Rosinek..................324/133 X |
| 3,437,928 | 4/1969 | Baker et al. ...............324/133 |
| 3,495,172 | 2/1970 | Davis...........................324/51 |
| 3,609,538 | 9/1971 | Schag ..........................324/66 |

Primary Examiner—Gerard R. Strecker
Attorney—Edward W. Hughes and Fred Jacobs

[57] ABSTRACT

In a cable having the wires of one end prewired and the wires of the other end ready to be connected to another component, the system disclosed allows an operator to select any wire in the cable without prior marking. The system identifies the wire by clocking a counter until the circuit completed by the wire disables the counter. A readout interrogates the counter and identifies the placement of the wire to the operator. Each wire is tested for correct placement by comparison to a reference line into a logic gate for each wire of the cable and checking the sum of the outputs of the logic gates.

6 Claims, 4 Drawing Figures

| TEST # | N1 GATE A | B | N2 GATE C | D | NN GATE E | F | ERROR | CONDITION |
|---|---|---|---|---|---|---|---|---|
| 1 | 0 | 0 | 0 | 0 | 1 | 1 | 0 | Nth WIRE OK |
| 2 | 1 | 1 | 0 | 0 | 0 | 0 | 0 | 1st WIRE OK |
| 3 | 0 | 0 | 1 | 1 | 0 | 0 | 0 | 2nd WIRE OK |
| 4 | 1 | 0 | 0 | 0 | 0 | 0 | 1 | ERROR-WIRE MISSING |
| 5 | 1 | 0 | 0 | 1 | 0 | 0 | 1 | ERROR-WIRE INTERCHANGED |
| 6 | 0 | 0 | 0 | 0 | 0 | 0 | 1 | ERROR-WIRE SHORTED | ize
APPARATUS TO VISUALLY IDENTIFY AND TEST WIRES IN A MULTI-WIRE CABLE

BACKGROUND OF THE INVENTION

This invention relates generally to a system for testing electrical circuits and in particular to a device for identifying and testing a multiple of wires in a cable for continuity and shorts.

The construction of cables and harness assemblies of large quantities of wires results in many production problems. A primary problem is the efficiency of the assembly process. A large harness having many individual wires means many tags or labels have to be attached to each wire of the cable and each tag must be searched in order to find the correct placement of the individual wire. This results in excessive wire handling. Also on completion of the wiring of the cable, each wire must be tested to verify the accuracy of assembly. In the previous methods of continuity checking such as by meter, buzzer or other continuity tester, only one check can be made at a time. These methods are extremely slow by comparison to automatic testers. Also no short tests can be performed because of the sheer multiplicity of points that require a check.

Prior art automatic testers performed point to point and short tests by stepping through each wire in sequence but the prior art devices could not be used to assemble or test a cable or harness having only one end of the cable or harness already wired with the other end free and ready for placement.

SUMMARY OF THE INVENTION

The present invention automatically identifies each wire of a cable or a harness, indicates the correct termination for each wire, and then tests for the correct connection of each wire in the completed cable or harness. A pulse identifying a particular wire through an encoder is transmitted along that wire to a comparator circuit. The comparator circuit output controls the pulse transmitting circuit to designate on a readout an identification of the wire. A test for continuity and shorts is performed by referencing each wire of the harness to a reference line containing the same pulse and by referencing each wire to every other wire in the cable. The sum of the outputs of the reference signals is sensed to identify the pulsed wire via a readout.

In this system, a counter produces pulses which are encoded to identify a particular pulse for a particular wire. To identify a wire, the pulse transmitted along that wire is transmitted to a comparator which, via a control logic, halts the transmission of further encoded pulses and activates a readout to identify that the comparator has sensed the location of the wire identified by the readout. In a test mode the beginning and end of each individual wire in a cable is checked by applying an encoded pulse via a counter and an encoder onto each wire of the cable. The pulse identifying the wire is also transmitted along a reference line. If the pulse appears on both the reference line and the line being tested, continuity is complete and another pulse is sent along another wire to check that wire. At the same time if the first pulse applied to its individual wire also appears on another wire of the cable, thereby indicating a short, the pulse will appear on the output summation point and will be gated to the control logic to halt the transmission of another pulse in order to signify the occurrence of an error and, via the readout, to indicate the wire having the error.

It is, therefore, an object of this invention to furnish an enhanced system for ease of assemblying and testing a cable or a harness.

Another object of the invention is to provide a system which permits identification of individual wires of a cable or harness having one end prewired without marking each wire.

Yet another object is to provide a system for testing a completed cable or harness by testing each wire individually and automatically for a missing wire, or an interchanged wire, or a shorted wire.

Still another object is to provide a system for assemblying and testing a cable or a harness by automatically identifying each wire for assembly and for continuity.

These and other objects will become apparent according to a preferred embodiment as the description proceeds and the features of the novelty which characterize the invention will be pointed out in particularity in the claims forming a part of this specification.

BRIEF DESCRIPTION OF THE DRAWINGS

Further features and a more specific description of an illustrated embodiment of the invention are presented hereinafter with reference to the accompanying drawing, wherein.

DESCRIPTION OF THE PREFERRED EMBODIMENT

Figure 1:
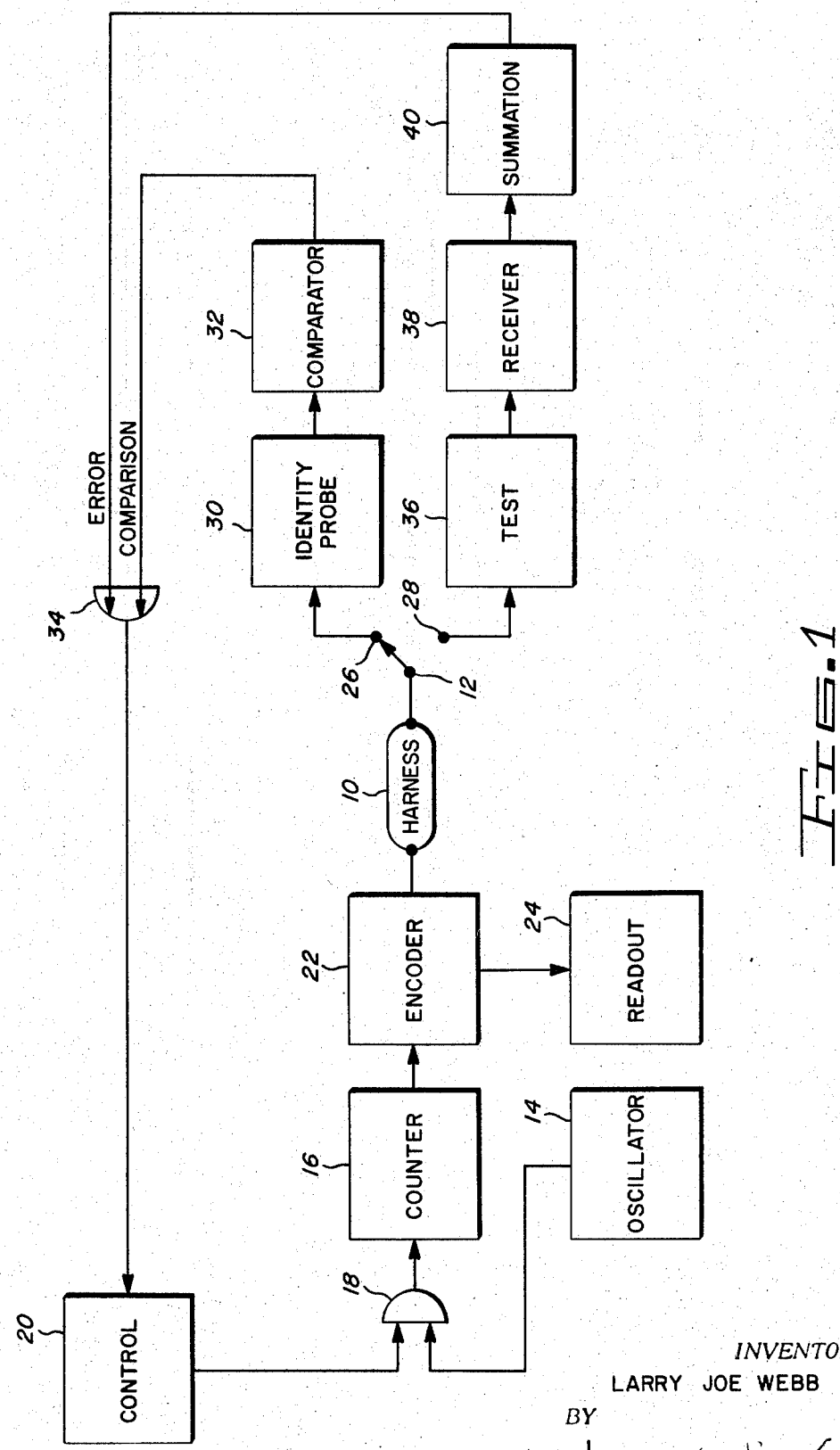
FIG. 1 is a block diagram of the cable/harness assembly and testing system according to the present invention.

In FIG. 1 a harness 10 is shown placed into the system in order to perform the tests of probing the individual wires of the harness to identify the individual wires or to test a completed harness to check for the correct wiring of the harness. The harness 10 of FIG. 1 is shown placed in the test fixture. A switch 12 symbolically shows that the harness 10 can be placed either in the position to identify the individual wires of the harness or to place the completed harness on test. In FIG. 1 the switch 12 is shown in position for the identifying of the individual wires.

In the block diagram of FIG. 1, pulses from an oscillator 14 are gated into a counter 16 via an AND-gate 18. The oscillator 14 sends out pulses continuously to one leg of the AND-gate 18. The other leg of the AND-gate 18 is regulated by a control circuit 20 which controls the gating of the oscillator pulses via the AND-gate 18 into the counter 16. In the control 20, circuitry performs the function of starting and stopping the oscillator pulses showing either that an error has occurred in the testing procedure of the harness 10 or that a comparison has been made in order to identify a particular wire in the harness. The operation of the control 20 will be discussed later.

The counter 16 can be of any type which counts each pulse from the oscillator 14. The output pulses of the counter 16 are transmitted to an encoder 22 which in effect puts a label on the particular count pulse. The encoder 22 directs a particular count pulse to a particular wire in the harness 10 which wire has been previously determined to be signified by the particular encoded pulse. The encoder 22 enables a readout 24 to show the count position of the counter 16. The readout 24 can be any type of display such as a group of lights which light up to signify a particular hundreds, tens and units of the counter position, or the readout can be of the common neon tube variety which contains internal elements to portray a particular number. The readout 24 signifies to the operator the wire that is being either tested or the wire that is identified as the one completing the circuit, which identification signifies the place to which the wire is to be soldered or otherwise fastened.

The encoder 22 also directs each count pulse to a particular wire of the harness 10 according to the set code. Therefore the particular count pulse is directed via the encoder 22 into the harness 10. The switch 12 is shown at the output of the harness 10 signifying that the system can be placed either into an identifying position 26 or a test position 28.

Still referring to FIG. 1, the switch 12 is shown in the identifying position 26 and the output of the harness 10 is directed via the switch 12 to an identity probe 30. The identity probe 30, shown in more detail in FIG. 2, performs the function of completing the connection of a particular wire in the harness 10 and, via the pulse from the encoder 22, permits the identification of the wire. The encoded count pulse is directed through the harness 10, through the identity probe 30 into a comparator 32 where the pulse is sensed. The comparator 32 signals that a comparison or identification has been made. An output signal of the comparator 30, labeled COMPARISON, is directed to one leg of an OR-gate 34. The output of the OR-gate 34 is directed to the control 20 which responds by disabling the AND-gate 18 and preventing the pulses from the oscillator 14 from being directed to the counter 16. The pulse which identified the wire by causing a comparison is displayed on the readout 24.

Figures 3, 4:
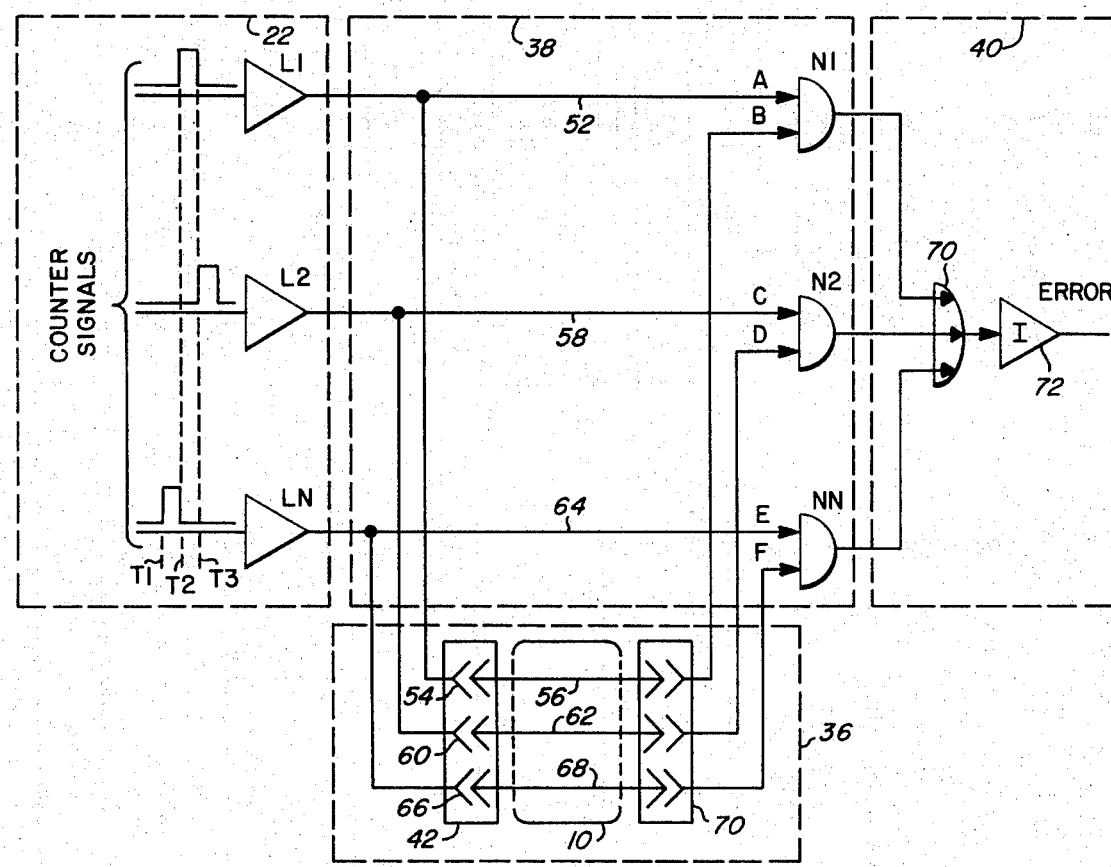
FIG. 3 is a logic diagram of the test mode of FIG. 1.
FIG. 4 is a chart of the different tests for the different conditions of the test mode system of FIG. 3.

The other position symbolized by the switch 12 is the test position 28. In the test position 28 each wire of the harness 10 is checked in turn for a missing wire, an interchanged wire, or a shorted wire. In the test position each count pulse is directed via the encoder 22 to every wire of the harness 10. The wires of the harness 10 are connected to a test station 36. The output of the test station 36 is directed to a receiver 38. The receiver 38 receives all of the encoded pulses from the encoder 22 via the harness 10 and the test station 36. The output of the receiver 38 is directed to a summation circuit 40 which sums all of the outputs of each wire in the harness. The summation circuit 40 sends an ERROR signal from its output to the OR-gate 38 if an error occurs. The ERROR signal occurs, as is shown later in FIG. 4, when a wire is missing or interchanged or shorted. The ERROR signal is transmitted through the OR-gate 34 and activates the control 20 which then disables the AND-gate 18 to prevent any further oscillator pulses from being transmitted to the counter 16. The encoder 22 signifies via the readout 24 the wire which failed the test. Thus the counter 16 will cycle through all of the harness wires when the switch 12 is in the test position 28 either until an error occurs at which time the counter is stopped, or until all of the wires are checked. A circuit for use in the test station 36, the receiver 38, and the summation circuit 40 is shown in FIG. 3 and will be explained in more detail later.

Figure 2:
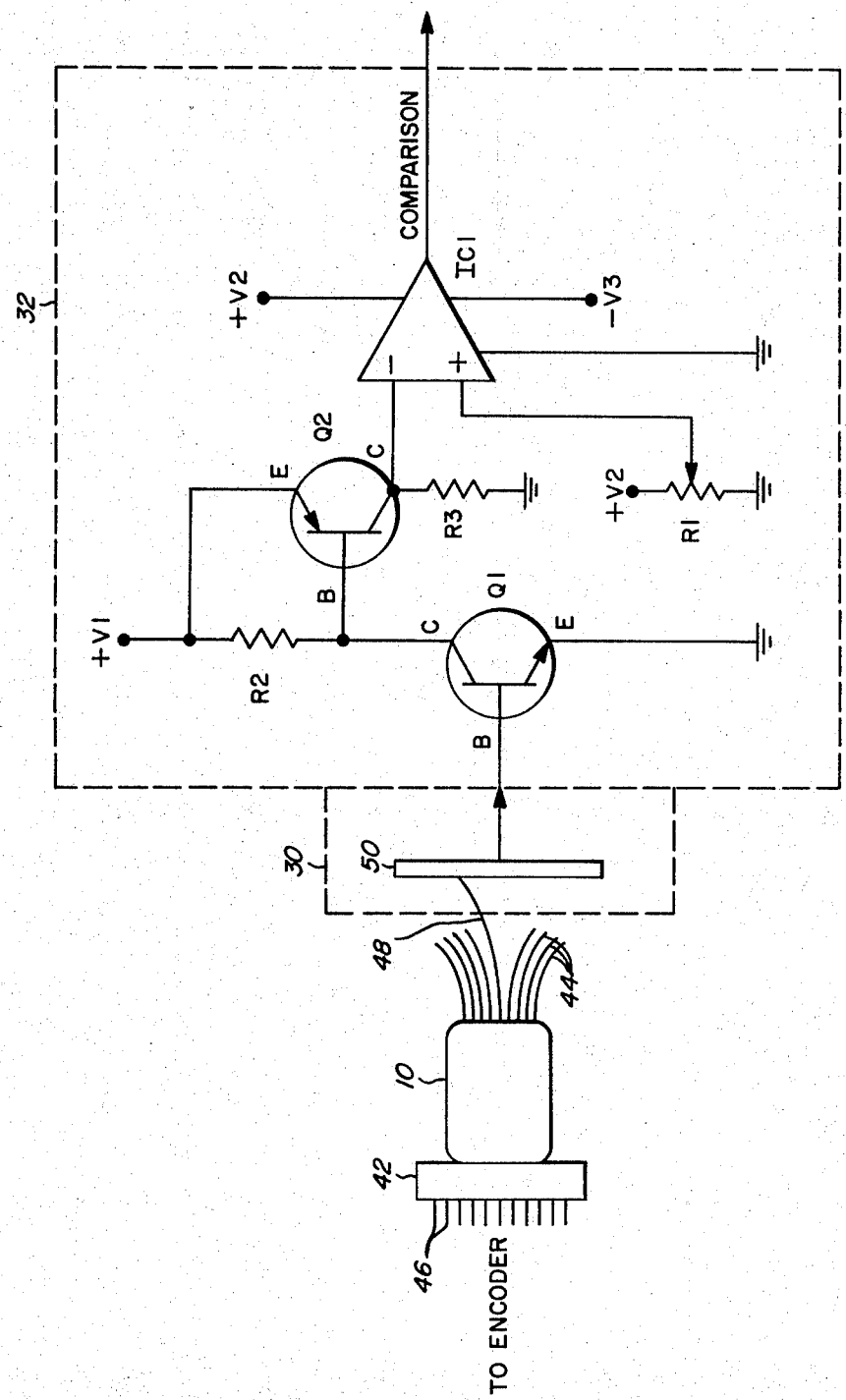
FIG. 2 is a detailed circuit diagram of the probe mode of FIG. 1.

In FIG. 2 a more detailed depiction of the harness 10, the identity probe 30, and the comparator 32 of FIG. 1 is shown. The harness 10 is shown with the individual wires of one end already randomly connected to a connector 42. The individual wires 44 of the other end are shown hanging free ready to be identified and connected to the specific electronic device according to a pin 46 in the connector 42 connected to the other end of the individual wires 44. The individual wires can be connected to another connector or to different circuits or components depending upon the use of the cable or harness. For identification of the wires of the harness, the connector 42 is connected to the encoder 22 such that the encoder can identify each particular pin 46 in the connector 42.

In FIG. 2 one free lead wire 48 is shown connected to a touch plate 50 of the identity probe 30 in position to be identified. The free end of the wire 48 is touching the touch plate 50 but it is obvious that a complete touching need not be necessary, for the conduction through the body of the operator could be sufficient to complete the circuit depending only upon the type of circuit selected for the comparator 32. The voltage potential of the pulse transmitted by the encoder is compared to a known value by the comparator and if the encoder 22 transmits a pulse through a pin 46 in the connector 42 and via the harness 10 through the wire 48 connected to the touch plate 50, a COMPARISON signal output is transmitted by the comparator 32. The comparator 32 of this embodiment, as shown in FIG. 2, comprises transistors Q1 and Q2, resistors R1, R2 and R3, and a differential voltage comparator integrated circuit IC1. Transistors Q1 and Q2 comprise a base element B, an emitter element E, and a collector element C.

The touch plate 50 of the identity probe 30 is connected to the base B of transistor Q1. The emitter E of transistor Q1 is connected to a ground potential and the collector C of transistor Q1 is connected to a positive potential V1 via resistor R2. The collector C of transistor Q1 is also directed to the base B of transistor Q2. The emitter E of transistor Q2 is connected to the positive potential V1. The collector C of transistor Q2 is connected to a ground potential via load resistor R3. The collector C of transistor Q2 is also directed to a minus (−) terminal of the integrated circuit IC1. A positive (+) terminal of IC1 is directed to a variable positive potential via the variable resistor R1 which is connected between a positive potential V2 and a ground potential. The ground potential, the positive potential V2, and a negative potential V3 are also connected to IC1 for the operation of the integrated circuit. The output of IC1 is the COMPARISON signal which is directed to the OR-gate as shown in FIG. 1. The integrated circuit IC1 can be any of the many well-known integrated circuit components performing a differential voltage comparison.

The operation of the identity circuit can best be explained by referring to both FIG. 1 and FIG. 2. The operation is started by the operator placing the system in the probe or search mode. In the search mode the switch 12, symbolically shown in FIG. 1, is placed into the position 26 as shown in FIG. 1. The operator then takes any wire from the free end of the harness 10 an either touches the free end of the wire to the touch plate 50 as shown in FIG. 2, or, as an alternative, the operator can simply hold the wire in one hand and touch the touch plate 50 with the other hand. Placing the system in the search mode signals the control 20 to enable the AND-gate 18 and thereby permits the oscillator pulses to be directed to the counter 16.

In the system presently being described, the counter 16 counts the oscillator pulses from one up to the total number of wires in the harness 10. The count pulse, via the encoder 22, is displayed and identified on the readout 24. Thus the counter 16 will continue to run until the particular wire 48 making the connection to the touch plate 50 is encountered. At this time the pulse sent out by the oscillator 14, counted by the counter 16, and encoded by the encoder 22 is directed by the wire 48 in the harness 10 to the touch plate 50. The pulse is amplified by transistors Q1 and Q2 and compared by the differential voltage comparator IC1 in order to sense the occurrence of a correct pulse. The differential voltage comparator IC1 will send out a signal when the pulse is received on the wire 48 touching the touch plate 50. This signal, the COMPARISON signal, is directed to the OR-gate 34. The OR-gate 34 directs this pulse to the control 20 which will disable the AND-gate 18 and thereby prevent any further oscillator pulses from reaching the counter 16. The count is stopped and the readout 24 will display the position of the counter 16. Thus the particular wire 48 which the operator is making connection to the touch plate 50 will be identified on the readout 24. The operator can then consult a board layout which contains the information that matches the readout or in some way identifies where that particular wire is to be connected. The operator can, therefore, via the system of the present invention, be told where the individual wire of the harness is to be connected without the problems occurred in attempting to color code each wire or to tab each wire when the harness connector 42 is assembled.

During the time the system is in the probe mode, the operator will connect each wire of the harness 10 to the particular components or circuits to which the individual wires are to be connected. After completing the connection of all of the wires, the operator switches from the probe mode to the test mode. This is symbolically shown in FIG. 1 by transferring the switch 12 from the identity position 26 to the test position 28. In FIG. 3 the encoder 22, the harness 10, the test box 36, the receiver 38 and the summation 40 is shown in more detail.

Referring now to FIG. 3, logic circuitry for use in the test mode is shown. The encoder 22 is shown connected to the harness 10 which in turn is shown connected to the testing circuit 36 and receiver 38. The signals from the receiver 38 are sent into the summation 40 with the output ERROR signal shown coming from the summation circuit 40. In the encoder 22, the encoded counter signals are shown directed to a plurality of line drivers shown as L1, L2 through LN. Only three are shown but it is evident that there is a line driver and a separate encoded signal for every wire in the harness 10. For ease of explanation only three are shown, it being evident that similar circuits are present or can be present for a harness containing many leads. The output of the line drivers are each directed to a reference line and to a pin in the connector 42 for connection to the harness 10. Thus line driver L1 is connected to a reference line 52 and to a pin 54 of the input connector 48 connected to a harness wire 56. Again only three leads are shown in the harness 10 for ease of explanation. The output of line driver L2 is connected to a reference line 58 and a pin of the connector which is connected to another wire 62 of the harness 10. The line driver LN is connected to a reference line 64 and a pin 66 of the connector 42 which pin is mated with a third wire 68 shown in the harness 10.

The reference line 52 is directed to one leg A of an AND-gate N1 included in the receiver 38. The receiver 38 has a number of AND-gates, one for each wire in the harness 10. Again only three are shown. The second leg B of AND-gate N1 is connected to the output connection of the harness shown in FIG. 3 as a connector 70. The output of the AND-gate N1 is connected to the summation circuit 40.

The receiver network 38 comprises a group of AND-gates N1, N2 through NN. Each of the AND-gates are connected to a reference line and to a wire in the harness in order to perform the test on the harness. The outputs of the AND-gates N1, N2 and NN from the receiver 38 are directed to an OR-gate 70 of the summation network 40. The output of the OR-gate 70 is directed to an inverter 72. The output of the inverter 72 is the ERROR signal which, as shown in FIG. 1, is directed to the control 20 which controls the oscillator output pulses.

For the operation of the test circuit, reference should be made to FIG. 3 along with the table of FIG. 4. In FIG. 4 six tests are given for the possible combinations of the three harness wires shown in FIG. 3. In the circuit of FIG. 3 positive AND-gates are shown for AND-gates N1, N2 and NN and therefore a "1" or high or enabling signal is required on both inputs to the AND-gate, in order for a "1" or enabling signal to appear on the output of the AND-gate. Any one or both of the inputs to the AND-gate being in a "0" or low or disabled condition results in a "0" or disabled output from the AND-gate. In the circuit of FIG. 3 line driver L1, L2 and LN are amplifiers which provide sufficient drive to enable and/or disable the AND-gates N1, N2 or NN. The inverter 72 provides a high or enabling signal on its output if there is a low or disabling signal at the input and, vice versa, if there is a high or enabling signal at the input to the inverter the output from the inverter will be low. The OR-gate 70 is a standard positive OR-gate and thus an enabling signal present on one or more of the inputs to the OR-gate results in an enabling signal on the output of the OR-gate.

Referring now to FIGS. 3 and 4 for the test No. 1, the encoded input signal, a positive going pulse, is applied at time T1 to the line driver LN. A positive going signal therefore appears on the output of the line driver LN and this positive pulse is applied to the reference line 64 directed to the E input terminal of AND-gate NN. The pulse is also applied to the connector pin 66 of the harness 10. The positive pulse is directed through the wire 68 of the harness 10 and via the connector 70 on the other end of the harness 10 to the F input leg of AND-gate NN. The encoded input signals are at the "0" or disabling level to the line drivers L1 and L2 and therefore the signals applied to the AND-gate N1, N2 and NN gate are as shown for test No. 1. The inputs A and B to AND-gate N1 are both low resulting in a low signal at the output of AND-gate N1. The similar situation applies to AND-gate N2. On AND-gate NN both E and F inputs are in an enabled state and therefore the output of AND-gate NN is enabled. Enabling the output of AND-gate NN enables the output of the OR-gate 70 and therefore results in a low or disabled ERROR signal. Therefore the condition as shown in FIG. 4 is that the Nth wire is in the correct place.

For test No. 2, a positive pulse is applied to line driver L1 at time T2 and if the wire 56 in the harness 10 is correctly placed both the A and the B inputs to AND-gate N1 will be enabled thereby enabling the output of N1. Since the positive pulse does not appear on the input of line drivers L2 and LN the input gates to AND-gates N2 and NN are low and therefor the outputs of AND-gate N2 and NN are low. The high signal at the output of AND-gate N1 is applied to the OR-gate 70 and via the inverter 72 results in a disabled ERROR signal similar as for test No. 1.

For test No. 3 the encoded input signal is applied to line driver L2 at time T3 which results in an enabled AND-gate N2 which again results in a disabled ERROR signal similarly for tests 1 and 2 as shown in the chart of FIG. 4. The condition for these three tests show that the receiver AND-gates were enabled at the correct time because the harness was correctly wired and thus no error occurred.

However for test No. 4, under which condition a wire is missing, the encoded input signal is applied to line driver L1 which results in a high or enabling signal on the AND-gate N1 input leg A via the reference line 52. The input B of AND-gate N1 however will be in a low state because the wire 56 in the harness 10 is missing (a "0" or low appearing at input leg B of AND-gate N1, see FIG. 4). Under this condition the outputs of all three AND-gates N1, N2 and NN are low and the output of the OR-gate 70 is low resulting in a high or enabled ERROR signal at the output of the inverter 72. The high ERROR signal disables the control 20 (see FIG. 1) and stops the oscillator pulses from being directed through the AND-gate 18 into the counter 16. Thus the readout 24 will designate to the operator which wire is missing.

Referring again to FIGS. 3 and 4, in test No. 5 the conditions shown in FIG. 4 are for an interchanged wire which also will result in an error condition. In test No. 5 the positive encoded input signal pulse is applied to line driver L1 which again results in the enabling of the input leg A of AND-gate N1. For this condition it is assumed that the wire in the harness instead of being connected to the B input leg of AND-gate N1 is instead connected to the connector pin which is wired to the D input leg of AND-gate N2. These conditions are shown for test No. 5 by the "1" on the A leg of AND-gate N1 and the "1" on the D input leg of AND-gate N2, see FIG. 4. Since only one leg of AND-gates N1 and N2 is enabled and neither of the input legs of AND-gate NN are enabled, resulting in a low signal from the outputs of all three AND-gates, a high or enabled ERROR signal is present at the output of the inverter 72. The high ERROR signal again results in the disabling of the counter 16, and therefore the operator again can read on the readout 24 the wire that is interchanged with another wire.

In test No. 6 the condition is for a shorted wire. A shorted wire will prevent the positive encoded input signal from appearing at the output of the driver associated with the pulse. Therefore all of the input legs to AND-gates N1, N2 and NN are low resulting in a low output signal from all three AND-gates. The low output signal from these AND-gates results in a low output signal from the OR-gate 70 and, via the inverter 72, a high ERROR signal. The high ERROR signal, as shown in the block diagram of FIG. 1, results in the disabling of the counter 16 and likewise the operator can scan the readout 24 to find the wire that is in error and is causing a failure of the test. Since the encoded input signals are applied to the line drivers in the timing as shown in FIG. 3, each wire of the harness 10 is tested in turn and if no error occurs the test will run through the entire list not stopping until an error occurs. Therefore, the operator need not intervene unless the test stops.

In the embodiment described in the drawing, it is obvious to those skilled in the art that many different types of logic circuitry and different configurations could be substituted without departing from within the present invention. The switch 12 shown in FIG. 1 is merely a symbolic representation of applying the harness 10 either for a wire identification or for a test of the entire harness. It is obvious that the switch 12 need not be made in the exact position as shown and that a disabling of the comparator 32 or the summation 40 can be accomplished to perform either a test or an identity probe respectively without switching the harness output.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, with the limits only of the true spirit and scope of the invention.

What is claimed is:

1. In a system for identifying and testing the placement of each free wire in a harness having one end prewired, the combination comprising:
   a counter for generating count pulses according to the count in said counter;
   means for connecting the wires of the prewired end of the harness such that each wire receives a particular count pulse;
   sensing means for sensing the occurrence of a count pulse;
   means for providing electrical connection between a free wire of the harness and said sensing means;
   control means connected to said sensing means and said counter for disabling the counter when said sensing means senses a count pulse;

readout means for displaying a representation of the count of said counter;

second sensing means for checking each wire in said harness;

reference leads corresponding to each wire in the harness and connected between said counter and said second sensing means such that each of said reference leads and its corresponding harness wire both receive the same count pulse;

means for proving electrical connection between each placed, free wire of the harness and said second sensing means;

said second sensing means generating an error pulse when said second sensing means fails to sense a count pulse from both the reference lead and its corresponding harness wire and when said sensing means senses the concurrent occurrence of the count pulses from more than one harness wire; and means for directing said error pulse to said control means to disable said counter.

2. The system of claim 1 wherein the means for providing electrical connection between a free wire of the harness and said sensing means is a touch plate to which the free wires of the harness are electrically connected.

3. The system of claim 1 wherein the means for providing electrical connection is a touch plate and the conductivity of the body of the human operator.

4. In a system for identifying and testing the placement of each wire in a harness having one end prewired, the combination comprising:

an oscillator generating electrical pulses;

a counter for counting said electrical pulses;

control means for controlling the transmission of said electrical pulses to said counter;

encoder means connected to said counter for directing the counted electrical pulses to each prewired wire in said harness according to the count in said counter;

comparator means for sensing the occurrence of said counted electrical pulse;

means for providing electrical connection between each free wire of the harness and said comparator;

means connected to said comparator for disabling said control means to stop the transmission of electrical pulses to said counter;

readout means for sensing the count of said counter and displaying said count;

a logic gate for each wire in the harness;

reference leads corresponding to each wire in the harness and connected between said encoder means and said logic gate such that each of said reference leads and its corresponding harness wire both receive the same count pulse;

means for providing electrical connection between each placed, free wire of the harness and said logic gate;

a summation logic gate connected to each of said logic gates;

said summation logic gate generating an error pulse when a clock pulse from said reference lead and its corresponding harness wire is not received concurrently by any of said logic gates and when the clock pulse is received concurrently by more than one logic gate; and means for directing said error pulse to said control means to disable said counter.

5. In a system for identifying and testing the placement of each free wire in a harness having one end prewired, the combination comprising:

a counter for generating count pulses according to the count in said counter;

means for connecting the wires of the prewired end of the harness such that each wire receives a particular count pulse;

sensing means for sensing the occurrence of a count pulse;

means for providing electrical connection between a free wire of the harness and said sensing means;

control means connected to said sensing means and said counter for disabling the counter when said sensing means senses a count pulse;

readout means for displaying a representation of the count of said counter;

reference leads corresponding to each wire in the harness and having one end connected to said counter such that each of said reference leads and its corresponding harness wire both receive the same count pulse;

second sensing means connected to each placed, free wire of the harness and to the second end of said reference leads for checking each wire in the harness against said reference lead by sensing the concurrent occurrence of said count pulse on each of said reference leads and its corresponding harness wires and by sensing the concurrent occurrence of said count pulse on more than one harness wire;

means for summing the concurrent occurrence of count pulses from each of said second sensing means and for generating an error pulse when said sensing means fails to sense a concurrence of count pulses from one of said reference leads and its corresponding harness wire and when said sensing means senses the concurrent occurrence of said count pulses on more than one harness wire; and means for directing said error pulse to said control means to disable said counter.

6. A system for testing a harness comprising:

an oscillator generating electrical pulses;

a counter for counting said electrical pulses;

control means for controlling the transmission of said electrical pulses to said counter;

encoder means connected to said counter for directing the counted electrical pulses to one end of each wire in the harness according to the count in said counter;

a logic gate for each wire in the harness;

reference leads corresponding to each wire in the harness and connected between said encoder means and said logic gates such that each of said reference leads and its corresponding harness wire both receive the same count pulse;

means for providing electrical connection between the second end of each wire of the harness and said logic gate;

a summation logic gate connected to each of said logic gates;

said summation logic gate generating an error pulse when the counted electrical pulse from said reference lead and its corresponding harness wire is not received concurrently by any of said logic gates and when said logic gates receive the concurrent occurrence of the counted electrical pulses from more than one harness wire;

means for directing said error pulse from said summation logic gate to said control means to disable said counter; and readout means for sensing the count of said counter and displaying said count.

* * * * *